Nov. 22, 1966   R. B. WADDELL, JR   3,287,194
METHOD OF MAKING A FLEXIBLE CORRUGATED CONDUIT
Original Filed April 17, 1962   3 Sheets-Sheet 1
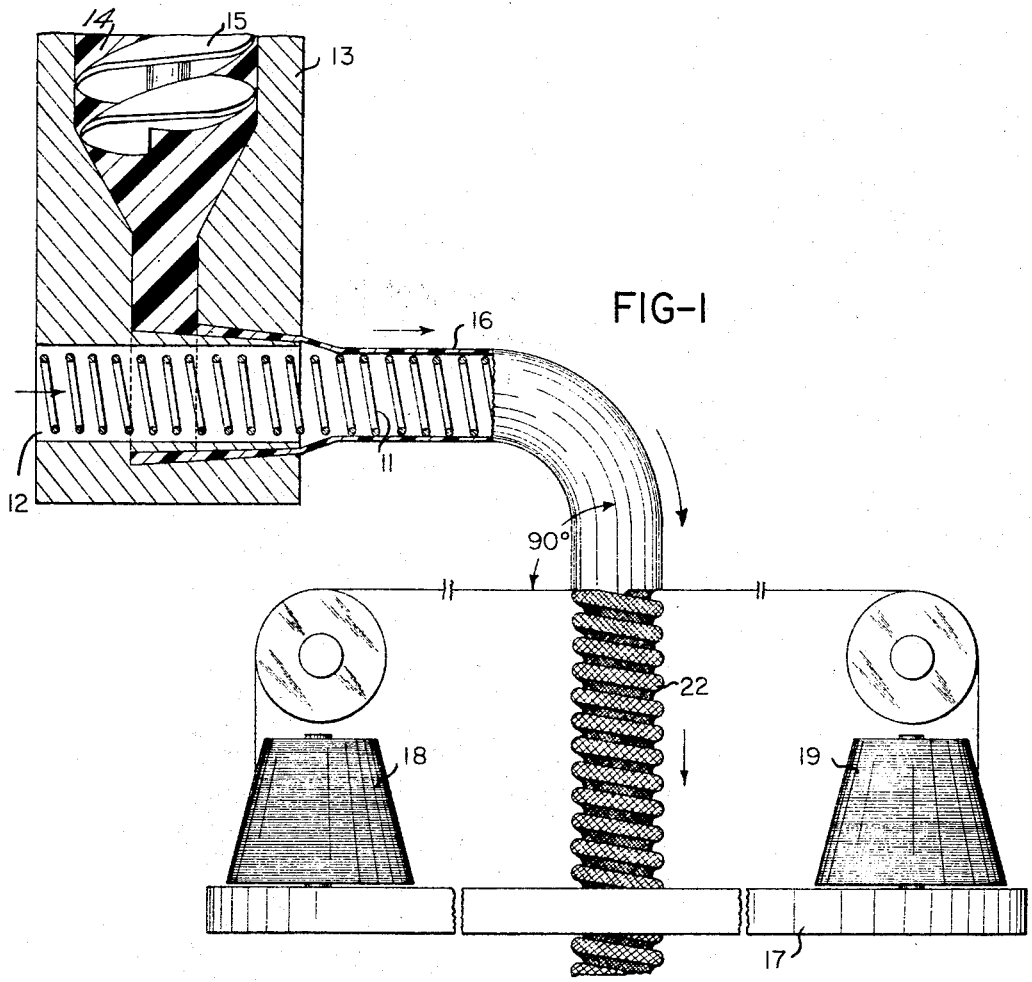
INVENTOR.
RUSSELL B. WADDELL JR.
BY
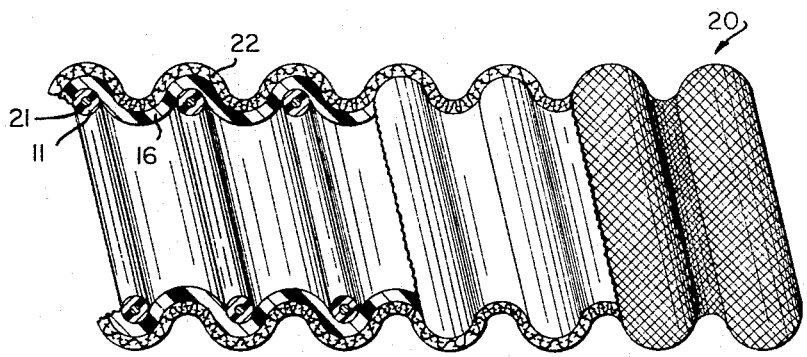
ATTORNEY Nov. 22, 1966 R. B. WADDELL, JR 3,287,194
METHOD OF MAKING A FLEXIBLE CORRUGATED CONDUIT
Original Filed April 17, 1962 3 Sheets-Sheet 2
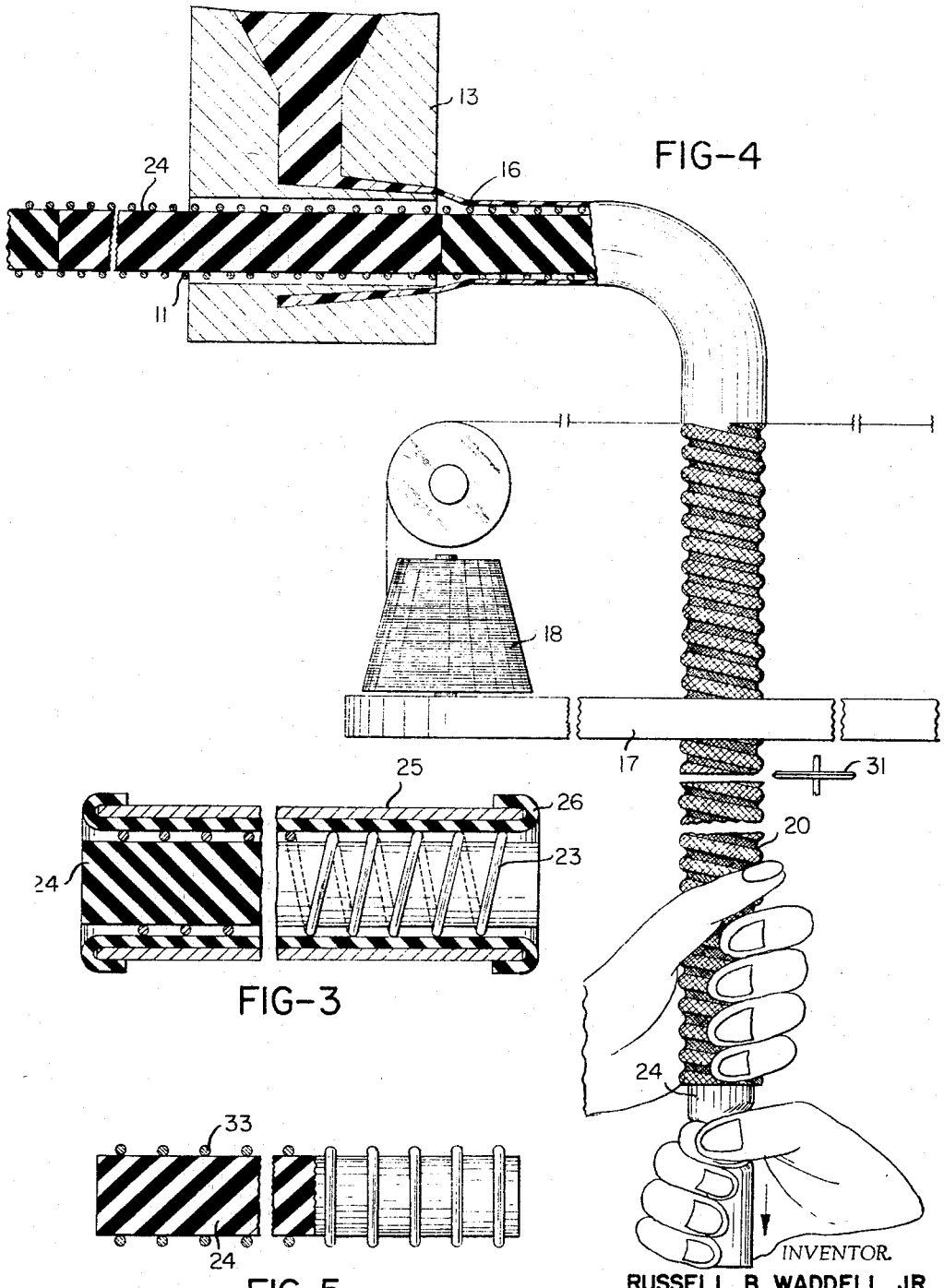
INVENTOR.
RUSSELL B. WADDELL JR.
BY
Reuben Wolk
ATTORNEY Nov. 22, 1966 R. B. WADDELL, JR 3,287,194
METHOD OF MAKING A FLEXIBLE CORRUGATED CONDUIT
Original Filed April 17, 1962 3 Sheets-Sheet 3
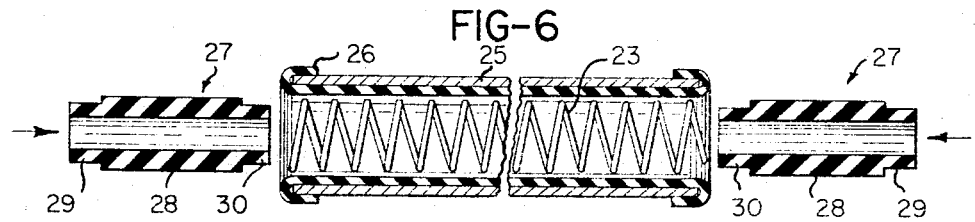
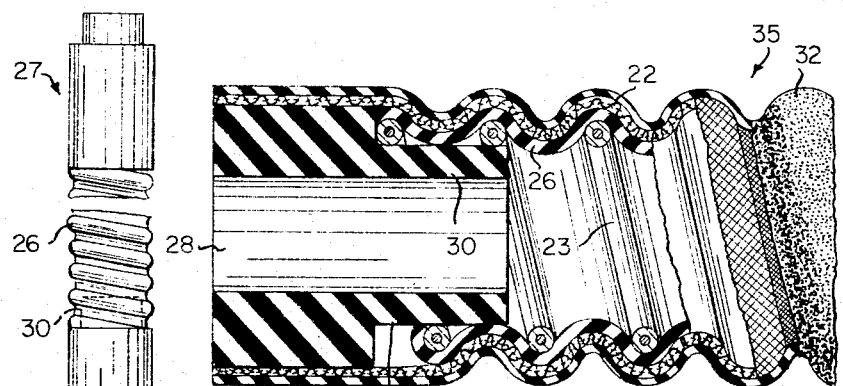
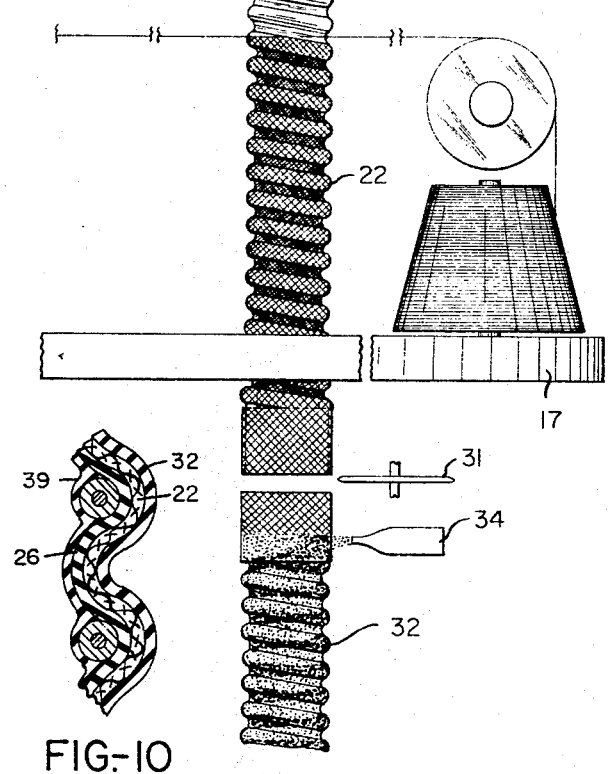
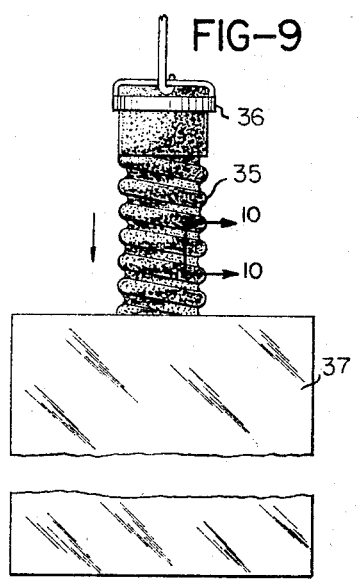
INVENTOR.
RUSSELL B. WADDELL JR.
BY
ATTORNEY

United States Patent Office 3,287,194
Patented Nov. 22, 1966

3,287,194
METHOD OF MAKING A FLEXIBLE CORRUGATED CONDUIT
Russell B. Waddell, Jr., Waynesville, N.C., assignor to Dayco Corporation, Dayton, Ohio, a corporation of Ohio
Original application Apr. 17, 1962, Ser. No. 188,042. Divided and this application Jan. 11, 1965, Ser. No. 435,769
7 Claims. (Cl. 156—144)

This application is a division of U.S. application Serial No. 188,042, filed April 17, 1962, now abandoned.

This invention relates to flexible conduit and method of manufacture, and particularly to conduit used for the transfer of fluids such as used in vacuum cleaners, hair dryers, oxygen and respirating devices, automotive cooling systems, and the like. More specifically, the present invention relates generally to flexible conduit of the type having a corrugated tubular body with internal helical reinforcing coils such as described in U.S. Patents Nos. 2,782,803, 2,766,806, 2,822,857, and 2,949,133, all of common assignment with the present application. The present invention also relates to an improved method for manufacturing such a conduit.

Flexible conduits of the type described in the above-mentioned patents are usually manufactured of elastomeric materials such as rubber or various plastics, and are light, flexible, impervious to penetration of the fluids being transmitted, and pleasing to the eye. At the same time, such conduits are capable of use even though subjected to critical bending and stretching forces during use. The prior art conduit has utilized various unifying means by which the inner reinforcing coils are bonded to the outer members that form the main body of the conduit, such as heat or adhesive. In addition, certain prior art devices, such as illustrated by U.S. Patent No. 2,897,840, utilize an enclosed mold and heat and pressure to provide the completed unit. Another method, illustrated in U.S. Patent No. 2,430,081, utilizes a cording process to provide corrugations, followed by a vulcanizing step. All these prior art devices have their uses and the methods employed have proved successful. However, it has long been desired to provide a simpler unifying means of manufacturing conduit to eliminate some or all of these steps, namely, heating, cording, adhesive bonding, or moulding, to reduce the cost of manufacture and provide other inherent advantages. Such a product and method are described in the present application in which the unifying means is provided by an outer fabric member which is formed in place, as by braiding to surmount the entire reinforcing coil and elastomeric assembly. The resultant unit has all the desirable properties sought in flexible conduit.

While prior art devices have suggested the use of outer fabric members, such members were not used as suggested in the present application. For example, in U.S. Patents Nos. 2,396,059, 2,430,081, and 2,897,840 the inventor has suggested the use of a knitted stockinet designated as "a stretchable open mesh fabric" for stiffening purposes. In U.S. Patent No. 2,913,011 strips of fabric tape have also been provided for such a purpose. In U.S. Patents Nos. 2,754,848 and 2,788,804 the use of lock knit open mesh stretchable members is suggested. While braiding has been used in conjunction with those as in U.S. Patent No. 2,918,777, there is a distinct concept found in the present application which does not appear in the prior art. This concept involves the use of a relatively non-stretchable fabric member formed in place, as by braiding, and providing the only force which unifies the conduit and creates convolutions between the coils. In addition, the present invention provides for the manufacture of a corrugated hose without the use of a hard metal mandrel such as described in the last-mentioned patent.

It is, therefore, a principal object of the present invention to provide a relatively inextensible flexible conduit which is light, flexible, resistant to collapse and has a pleasing appearance.

It is a further object of the present invention to provide such a conduit having internal reinforcing coils and outer elastomeric members which are secured to the coils without the use of heat, adhesive, cording, or molding.

It is a further object of the present invention to provide a conduit having an outer cover formed in place, as by braiding, to create convolutions between the turns of the reinforcing coil.

It is an additional object of the invention to provide a method of manufacturing such conduit without the use of an internal solid mandrel.

It is still another object of the invention to provide either a continuous or discontinuous method for manufacturing the flexible conduit.

It is still another object of the invention to provide an alternative method of manufacturing by the use of a soft compressible mandrel upon which the conduit may be built and subsequently removed.

It is still another object of the invention to provide a method of manufacturing conduit which is simpler and less costly than previously devised methods.

To achieve the above and additional objects of the invention, as apparent from reference to the following description, a principal form of the invention contemplates utilizing continuous movement of a reinforcing coil through an extruder or crosshead tuber which thus deposits an outer elastomeric member upon the reinforcing coil. This is somewhat similar to the methods described in U.S. Patents Nos. 2,931,069 and 2,963,749. The covered conduit is then passed through a braiding machine in which the tight braid is formed in place upon the conduit to create the unifying force.

A variation of the above method may consist of manufacturing individual conduits in the manner practiced by applicant's assignee in the first-mentioned group of patents above. Additional variations include the use of compressible or crushable mandrels which may be used during the processing and later removed, and the addition of outer elastomeric members around the fabric cover in order to provide a more desirable surface. Regardless of which of the above methods are used, the necessity for heat bonding, adhesive bonding, cording, or molding is eliminated, thus providing a product which is relatively inextensible and yet has the properties of free and unopposed flexing when it is necessary to form bends in the conduit. The elimination of conventional bonding means provides improved flexing for such purposes.

The invention is further described in the following specification and drawings, in which:

FIGURE 1 is an elevational view, partially in section, illustrating a method of manufacturing the conduit.

FIGURE 2 is an enlarged elevational view, partially in section, illustrating a completed product made in accordance with FIGURE 1.

FIGURE 3 is a sectional view of an alternative method of manufacturing a conduit in accordance with the present invention.

FIGURE 4 is an elevational view in partial section illustrating a variation of the method illustrated in FIGURE 3.

FIGURE 5 is a sectional view illustrating a variation of the method of FIGURE 3.

FIGURE 6 is a sectional view of a method of manufacturing a modified conduit of the present invention.

FIGURE 7 is an elevational view in partial section illustrating a further step in the manufacture of the conduit of FIGURE 6.

FIGURE 8 is an elevational view, partially in section, of a completed conduit made in accordance with the processes of FIGURES 6 and 7.

FIGURE 9 is an elevational view illustrating a further modified process.

FIGURE 10 is a sectional view of a conduit resulting from the modified process of FIGURE 9, taken along lines 10—10 of FIGURE 9.

Referring now to FIGURE 1, a preferred method of forming the conduit is illustrated in which a reinforcement having axially spaced turns, such as a continuous helical reinforcing spring 11, is passed by well-known means through the orifice 12 of an extruder or crosshead tuber 13. The spring is made of a metal or plastic wire coated with synthetic or natural rubber, or a thermoplastic material such as vinyl, polyethylene, polypropylene, etc. In the upper portion of the extruder is a mass of material such as polyvinyl chloride, polyethylene, polypropylene, rubber, or other extrudable thermoplastic materials, generally designated by reference numeral 14. These materials are referred to throughout the specification as "elastomeric," by which is particularly meant materials capable of plastic flow, having a high degree of elastic memory and capable of shaping. Although rubber and thermoplastic materials are preferred, certain thermosetting plastics may also provide these properties. This material, which is designated in the figure as a plastic, is forced through the orifice by means of a driving mechanism 15. Further details of the coil advancing mechanism and the extruder are not illustrated in further detail since these are also old in the art, as described, for example in U.S. Patents Nos. 2,931,069 and 2,963,749 which relate generally to methods of extruding over reinforcing coils in similar fashion. The passage of the material 14 through the extruding die causes the material to form in the shape of an outer layer 16 that continuously covers the coil after it has passed through the extruder. From this point the assembly passes through a braider 17 which consists of a rotating ring upon which is mounted a number of spools 18 and 19 of fibers. These fibers may be nylon, rayon, polyester, cotton, or other suitable materials.

It should be noted at this point that the passage of conduit may be in a straight line rather than being forced into a bend as shown in FIGURE 1, but this showing is primarily for the purpose of convenience. Although only two spools are illustrated in this drawing, it is understood that as many as desired may be used; in fact, the actual number to be used will be closer to ten or twelve. The full details of the type of braiding machine to be used are not described herein, but may be found by referring to U.S. Patent No. 2,257,648 which illustrates more fully the working of such a mechanism. The braiding mechanism applies a tightly braided cover 22 around the previously assembled coil and outer elastomeric tubing; by setting the braiding mechanism for a theoretical diameter which is less than the diameter of the coil, it is possible to create a very tight braid and force the thermoplastic material deeply between the adjacent turns of the reinforcing coil, thus creating corrugations. As an example of the relationship of the various member, the coil 11 has an internal diameter of 1.250 inch and an external diameter of 1.382 inch; the outer layer 16 before braiding will have the same internal diameter as the external diameter of the coil; while the braider is set to provide a theoretical diameter of about 0.25 inch; by theoretical diameter is meant the diameter which would be obtained from the braiding mechanism if a tube were braided by itself instead of upon the coil and layer assembly. Of course, the braided cover never reaches this theoretical diameter because of the opposing force provided by the coil 11, but the resultant cover has a high degree of radial force upon the coil. The elements of the braid, as shown in the drawing, are applied at approximately 90 degrees to the axis of the conduit as it passes through the machine, varying from this angle by no more than 15 degrees. This angular relationship is highly important in order to obtain the maximum radial pressure referred to above. After the braiding step, the conduit is severed to length by a cutter 31.

Because of the unifying force provided by the braid on the outer surface, it is possible to create a completely unified assembly without the need for heat, cording, adhesive, or molding. It has been noted, however, that the pressure of the outer cover 16 on the coated surface of the coil 11 may create a slight bond because of the cold flow of the contacting thermoplastic materials. It should be further noted that the effect produced herein cannot be obtained by knitting, weaving, or any other textile processing since only braiding will provide the necessary radial force. The braided cover is actually formed in place over the elastomeric tube and the resultant assembly is thus different from those having covers which are pre-formed. The tightness of the braid and depth of the corrugations may be controlled by the setting of the mechanism. It is possible to braid the cover fairly loosely and by application of heat (such as steam) the cover may be later shrunk to achieve the tight cover desired.

FIGURE 2 illustrates a completed segment of conduit 20 manufactured in accordance with the process just described. As can be seen, the reinforcing coil 11 has a coated thermoplastic surface 21 which is similar to the material used in the outer thermoplastic layer 16. The outer braided cover designated as 22 has created the locking force and the deep corrugations shown therein.

In lieu of the extrusion step illustrated in FIGURE 1, a non-continuous method of forming the coil and elastomeric cover may be obtained by following the teachings of the above-mentioned Patent No. 2,822,857 in which the elastomeric cover is snapped over the reinforcement. The resultant assembly is then passed through the braiding mechanism as in FIGURE 1 in order to obtain a finished product which, however, will be in the form of a shorter individual unit instead of a long continuous unit as produced by FIGURE 1.

FIGURE 3 illustrates a modified form of the invention in which the coil 23 of desired length is placed upon a compressible mandrel 24. This mandrel, which is circular in cross section, is approximately the same length as that of the coil, which is placed loosely upon said mandrel as shown. The mandrel may be made of any soft thermoplastic materials such as those discussed above, or as shown in the figure, it may be made of rubber. If desired, the central portion of said mandrel may be comparatively rigid and made of jointed segments of a metal such as aluminum, and surrounded by the soft material. As a further modification, the mandrel may be made of a hollow tube of the soft material, rather than a solid one. In each case, there is provided a mandrel which is compressible and yet sufficiently rigid to retain the coil. The entire assembly is now placed within a vacuum box 25 more fully described in the aforesaid Patent No. 2,822,857 and by means of the process described therein an assembled unit is formed by placing an outer tubular member 26 within the vacuum box and collapsing it upon the coil and mandrel. Although the member 26 is illustrated as being rubber, it may be made of any of the other materials described above. In lieu of forming a coil with a soft mandrel in a vacuum box, the mandrel may be fed through the previously described crosshead as shown in FIGURE 4, the outer cover 16 formed exactly as before and placed about the mandrel and coil. From this point it is passed through the braider as in FIGURE 1 and the outer braided cover is locked on as before. It is now only necessary to remove the compressed mandrel by pulling it from the completed conduit 20; this is illustrated in FIGURE 4 as a manual procedure, but may also be done by automatic machinery. It is also possible to cut the mandrel and surrounding conduit to a desired length prior to removal of the mandrel.

The compressible mandrel has additional advantages than those just described. For example, the reinforcement with axially spaced turns need not be a helical coil, but may consist of a series of individual circular members such as designated by reference numerals 33 in FIGURE 5. These members are placed upon the mandrel 24 in axially spaced relationship, having a diameter sufficient to very slightly compress the mandrel and retain the axial relationship. The mandrel and reinforcement are further processed as in FIGURE 3, in which an outer tube is snapped on, and subsequently passed through the tuber or extruder as in FIGURE 4.

The compressible mandrel described above will provide slightly more stiffness and resistance to the braiding forces, which in some instances is desirable. It thereby serves as another means for controlling radial forces applied during the process.

FIGURE 6 illustrates a modified form of the invention employing basically the vacuum box method previously referred to, in which the tubular cover is placed within the vacuum box 25, the vacumm applied to expand the tubular member to the position shown, and the helical reinforcing coil placed within the cover. In the type of hose illustrated, it is desirable to provide integral couplings at the ends so that cords may be used to connect other units of a fluid system such as an automobile engine block to a radiator, for example. This may be done by inserting a pair of cylindrical tips 27 within the coil as shown; these tips preferably consist of the same material as the tubular member 26, are hollow, and have central boss portions 28 and reduced end portions 29 and 30. The portions 30 are inserted within the coil, thus permitting the remaining portions of the tip to extend radially outwardly thereof. When the vacuum is released, the cover 26 is collapsed inwardly to tightly surround the coil and the tips. The portion of the cover material 26 which extends beyond the shoulder 38 is excess and is trimmed away in a manner which is conventional in the art of hose making; this excess material having served its function of providing a vacuum box seal. The entire assembly is then passed through the braiding mechanism and a tight cover braided over the entire assembly of conduit and tips, as shown in FIGURE 7. The resultant product may then be severed by cutting midway of the tips by means of a conventional cutter 31 as shown. The entire surface may then be coated with rubber or plastic material by means of a spray 34 as shown; or alternatively, by dipping, by snapping on another tube as in FIGURE 6, or by passing through an extruder as in FIGURE 1. The resultant product 35 is illustrated in greater detail in FIGURE 8 and consists of the reinforcing coil 23, the outer tubular member 26, the outer braided cover 22, one-half the original tip section 27 in which the portion 30 is within the coil and one-half of the original boss portion 28 extends outwardly thereof, and the outer coating 32. This product has particular utility for automotive radiator coolants in which an outer protective cover is desirable; for such use the materials are illustrated as being of rubber, but they may be made of the plastic materials referred to above. In lieu of providing an outer cover only, it may be desirable to place an inner coating within the tube as well. This may be accomplished by the process illustrated in FIGURE 9, in which the conduit 35 is shown supported by a holder 36 and is dipped into a tank 37 containing a suitable elastomeric material which then coats both inner and outer surfaces. The resultant product has a coating or covering 39 on both surfaces, as illustrated in FIGURE 10.

The present invention provides a highly useful, relatively inextensible conduit, in which the bonding is accomplished without the use of conventional molding, heat, adhesives, or cording. The braided outer surface provides a high degree of radial force which locks the entire assembly together, and is the only force providing this function.

While the present invention has been described above by means of specific embodiments, it is understood that these are merely exemplary and in no way intended to limit the scope of the invention claimed herein.

I claim:
1. The method of manufacturing a flexible externally corrugated conduit comprising the steps of forming a reinforcing coil having axially spaced turns, forming a tubular elastomeric member about said coil, and tightly braiding a fiber cover about and exerting a radially inward force on said tubular elastomeric member to force said member to embrace and surround said coil and to unify the components of said conduit and form corrugations therein.

2. The method of claim 1 including the step of braiding said cover at approximately right angles to the longitudinal axis of said conduit.

3. The method of manufacturing a flexible externally corrugated conduit comprising the steps of forming a reinforcing coil having axially spaced turns, forming a tubular elastomeric member about said coil, inserting cylindrical tip sections within the ends of said coil to serve as couplings, and tightly braiding a fiber cover about and exerting a radially inward force on said tubular elastomeric member to force said member to embrace and surround said coil and to unify the components of said conduit and form corrugations therein.

4. The method of claim 3 including the step of applying an elastomeric cover about said braided cover.

5. The method of claim 4 including the step of applying an elastomeric coating to the interior of said conduit.

6. The method of manufacturing a flexible externally corrugated conduit comprising the steps of placing a reinforcing coil having axially spaced turns on the outer surface of a soft compressible mandrel, forming an elastomeric tubular member about said coil, tightly braiding a fiber cover about and exerting a radially inward force on said tubular elastomeric member to force said member to embrace and surround said coil and to unify the components of said conduit and form corrugations therein, and subsequently removing said mandrel.

7. The method of claim 6 including the step of applying an elastomeric cover about said braided cover.

References Cited by the Examiner

UNITED STATES PATENTS

| | | | |
|---|---|---|---|
| 248,841 | 11/1881 | Bourguignon | 156—143 X |
| 2,898,942 | 8/1959 | Rothermel | 156—144 X |
| 2,961,007 | 11/1960 | Martin | 156—144 X |
| 2,963,750 | 12/1960 | Pavlic | 156—144 X |
| 3,028,289 | 4/1962 | Roberts et al. | 156—143 |
| 3,129,631 | 4/1964 | Hill et al. | 87—6 |

EARL M. BERGERT, *Primary Examiner.*

P. DIER, *Assistant Examiner.*